May 27, 1958 — R. E. MULLIN — 2,836,699
INSTANTANEOUS WATER HEATER
Filed July 20, 1956

INVENTOR.
Robert E. Mullin
BY
Thos. E. Scofield
ATTORNEY.

2,836,699

INSTANTANEOUS WATER HEATER

Robert E. Mullin, Independence, Mo., assignor to Mullin Gomel Company, Independence, Mo., a corporation of Missouri Application July 20, 1956, Serial No. 599,210

17 Claims. (Cl. 219—40)

The present invention relates in general to the heating of water, and it deals more particularly with improved apparatus for heating water in domestic hot water systems such as are employed, for example, in residential, institutional and industrial installations.

The object of the invention, broadly speaking, is to provide apparatus for supplying hot water on demand without requiring a storage reservoir of preheated water —a system which, in other words, exerts its heating effect only upon the water actually delivered to the user as and when it is so delivered, whereby energy is consumed only at those times and the energy is instantaneously and efficiently utilized for the immediate heating need.

In this connection, an important object of the invention is to provide an improved instantaneous water heater utilizing electrical energy and capable of converting that energy into heat which is imparted directly to water occupying the space between a pair of electrodes forming part of the walls of a water passageway through said heater. Another object is to provide automatic control means for energizing said heater from the electrical source only when the water is flowing through said passageway, no energy being consumed when the water is in static condition.

A further object is to provide an automatic instantaneous water heater which is very compact so that it may be installed at any place in the user's premises and which may, for example, conveniently be connected to an existing cold water line to convert it to a hot water line.

Another object is to provide a heater of the character indicated having means for easily and conveniently varying the amount of heat delivered to the water passing therethrough; in this connection, a feature of the invention resides in the provision of a multistage heater having means for rendering any desired number or group of stages effective at a given time.

According to another feature, my electrically energized water heater comprises an elongate conductor or bus which is maintained at one potential, this bus being encircled at intervals along its length by annular electrodes which are maintained at a different potential from that of the bus. The water to be heated is caused to flow along the length of the bus, passing in turn through the space between it and each of the various annular electrodes, whereby the water is subjected to the flow of electrical current between each electrode and the bus.

Still a further object of the invention is to provide a heater of the foregoing character which is economical to manufacture and simple to service. In connection with this, another feature resides in making the aforementioned bus in sections which are separable from one another, each section being associated with one of said annular electrodes to form an integral unitary structure.

A related object is to provide a detachable mounting for the heater which not only supports the unit physically but at the same time makes the necessary electrical connections therewith, all to the end that heaters of this type may readily be interchanged or removed and replaced very easily and simply in connection with the servicing thereof.

Other and further objects of the invention, together with features of novelty whereby the objects are achieved will appear in the course of the following description.

In the accompanying drawings which form a part of the specification and are to be read in conjunction therewith, and in which like reference numerals are employed to indicate like parts of the various views.

Figure 2:
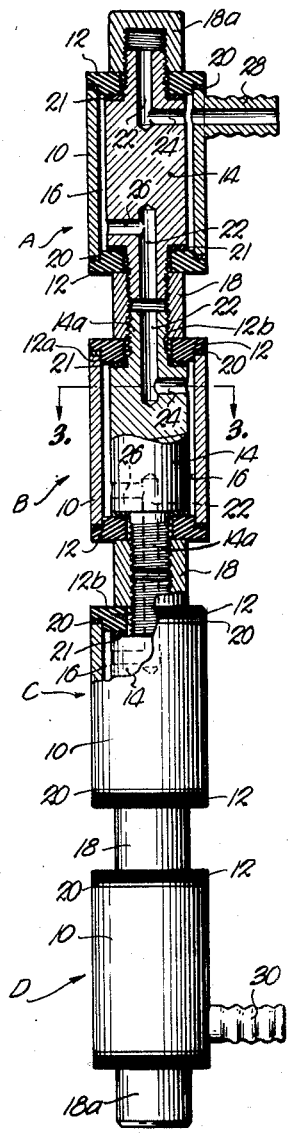
Fig. 2 is a sectional elevation of my water heater drawn to an enlarged scale.

Referring more particularly to Fig. 2, the heater shown therein is an elongate member having four enlarged sections, these comprising four separate heater stages A, B, C and D, which are basically alike in construction. Taking the intermediate stage B as illustrative, this has a hollow cylindrical barrel or outer electrode 10 with a pair of circular caps or closures 12 at its opposite ends, the two caps being formed of suitable insulating material. Each end cap is a disk-shaped member having an annular rabbet 12a for receiving the end portion of the barrel and thus maintaining the cap properly centered with respect thereto.

Within the barrel is a cylindrical core or inner electrode 14, this being provided with integral externally threaded nipples 14a which extend axially from both ends through central apertures 12b in the two end caps. The outside diameter of the core is smaller than the inside diameter of the barrel, leaving an annular space 16 therebetween, but end caps 12 insure that the two members are coaxial. Each end cap is secured in place by an internally threaded collar 18 screwed on the portion of the nipple 14a projecting beyond the cap; between the inner faces of the caps and the ends of barrel 10 and core 14 are a pair of gaskets 20 and 21 which are placed under compression by the aforementioned screw-threaded connection, thereby insuring that the annular chamber 16 is sealed against leakage.

Each nipple 14a has an axial bore 22 extending inwardly a short distance from its end, and communicating with these are a pair of cross bores 24 and 26 respectively. The latter thus are located near the opposite ends of core 14, and it is important to note that the lateral bore 24 opens into the annular chamber 16 on one side of the core 14 while bore 26 opens into the chamber on the opposite side of the core.

The internally threaded collars 18 on opposite ends of stage B of the heater serve to connect stages A and C thereto, each of the latter being provided with externally threaded nipples 14a such as already described which screw into the collars. Stages C and D are joined in the same fashion. As many stages as desired can be connected in a series in this manner, four having been shown as illustrative in the present instance. As previously mentioned, the core 14 of each stage has a pair of diametrically opposed cross bores 24, 26 at its ends—but the cross bores of one stage need have no precise directional orientation relative to those of the next inasmuch as each stage functions as an independent unit.

The intermediate stages, such as B and C, are virtually identical to one another, and the end stages differ from them in only two respects: First, the outermost disk 12 is secured in place by an internally threaded cap 18a which is essentially like the collars 18 except that it is closed on the end. Second, adjacent the outermost disk 12 the barrel 10 of each end stage is provided with an inlet or outlet nipple 28, 30. Referring to the upper portion of Fig. 2, it should perhaps be mentioned that the cross bore 24 and axial bore 22 communicating with the interior of cap 18a actually serve no useful purpose in the end stage so may be omitted if desired; they nevertheless are shown in the drawing because economies resulting from standardization of parts are realized by using the same type of core 14 in all stages, whether they be intermediate or end stages. It is important, however, in the end stages that nipple 28 and cross bore 26 communicate with the annular chamber 16 at diametrically opposed points so that water traveling through the chamber between the two points must pass around the exterior of core 14; the same is true of course in the opposite end stage D.

(It may well be noted at this point that collars 18 not only couple adjoining stages together physically but also serve as an electrical connection between the cores or inner electrodes of adjoining stages. Stated differently, members 14, 18 and 18a in the finished assembly make up a single continuous conductor or bus extending the full length of the heater, this bus being relatively small in diameter in the regions defined by collars 18 and being somewhat larger in diameter in the regions 14. The bus is of course constructed of separable sections which facilitate disassembly and encircling each enlarged portion thereof, i. e., each core 14, is a cylindrical electrode 10 which is electrically insulated from the bus by means of the annular spacing insulators 12, but which is associated in unitary fashion with one of said sections.)

Figure 1:
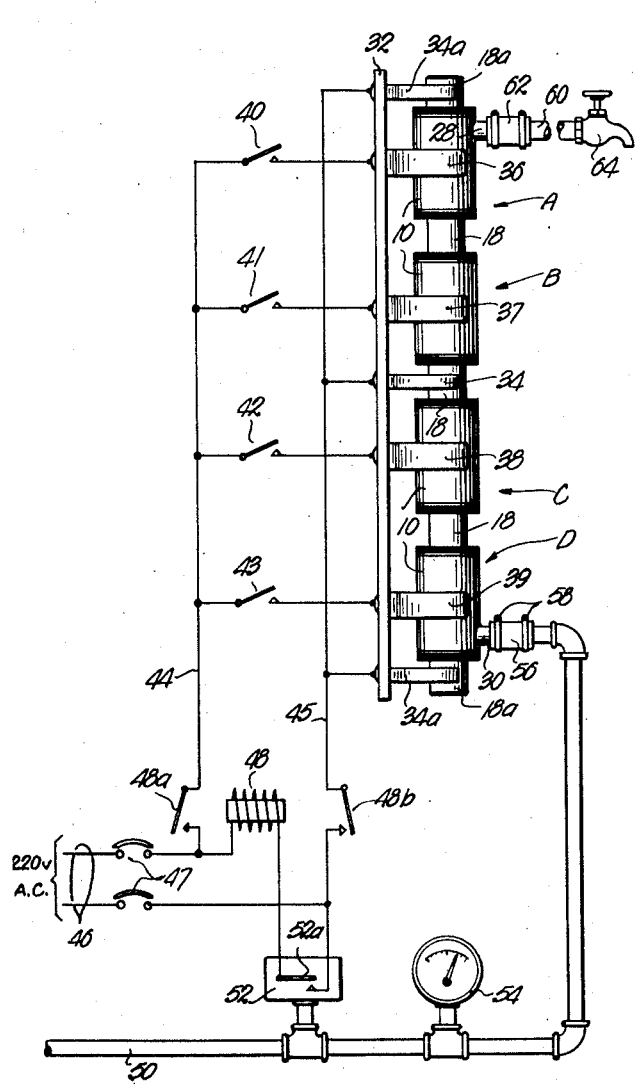
Fig. 1 is a side elevational view of my improved heater showing the manner in which same is mounted and connected to a water supply line, the electrical connections to the heater being illustrated in diagrammatic form.
Figure 3:
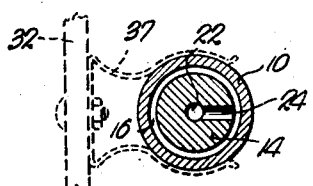
Fig. 3 is a horizontal cross section taken along the line 3—3 of Fig. 2 in the direction of the arrows, portions of the mounting or support being shown in dotted lines.

The manner in which my heating unit is mounted will be clear from Figs. 1 and 3. The support comprises a panel 32 made of suitable electrical insulating material and having on its face a series of vertically aligned spring clamping brackets, each comprising a pair of arms tensioned toward one another to grip some part of the unit therebetween. More particularly, bracket 34 is arranged to clamp the central collar 18 while brackets 34a clamp the two end caps 18a, the collar and caps all forming part of the aforementioned longitudinal bus. On the other hand, brackets 36, 37, 38 and 39 grip the outer electrode or barrel 10 on stages A, B, C and D, respectively. It will be noted that the respective ones of the latter brackets are connected through individual manually operated switches (40, 41, 42 and 43) to a common conductor 44 while brackets 34 and 34a all are connected to a second common conductor 45. The two conductors are adapted to be energized from a 220 v. supply line 46 through a circuit breaker or master switch 47 and a pair of normally open solenoid-operated contactors 48a and 48b.

Water under normal main pressure is supplied to my heater through a supply line 50 having a pressure sensitive switch 52 and a pressure gauge 54 connected thereto. The supply line preferably is connected to the inlet nipple 30 of the heater by means of a hose coupling 56 provided with conventional clamps 58. The outlet nipple 28 is connected to a utilization line 60 by a similar hose coupling 62, and the utilization line may be provided with one or more faucets 64 or other conventional devices by means of which the user may avail himself of the water supply.

There is of course no flow of water until such time as the faucet 64 or equivalent discharge device is manually opened by the user. At such time the water flows the full length of my heater, entering at the bottom from the supply pipe 50 and leaving at the top, from which point it travels via the utilization line 60 to the point of discharge. In flowing from one stage to the next, it passes, of course, through the collar 18 connecting the two stages; and in each individual stage, it passes completely around the inner electrode 14, entering the bottom of the associated chamber 16 on one side of the electrode and leaving the top of the chamber on the opposite side. When the faucet or other discharge device 64 is closed by the user, this flow naturally ceases, although the flow passageway through my heater remains filled with water as does the entire pipe line leading up to the point of discharge.

When no water is flowing, the condition of the electrical circuit is as shown in Fig. 1 except that it may be assumed circuit breaker or master switch 47 is closed and the manual switches 40 to 43, inclusive, also are closed; notwithstanding this, there is no flow of electrical current in the circuit, inasmuch as contacts 48a, 48b and 52a are open. The last mentioned contact is in the pressure switch 52, this being a conventional device which is sensitive to pressure in the line 50 and reacts to changes in the pressure in a manner adapted always to maintain contact 52a open whenever there is no flow of water through the supply line, but to close the contact whenever water is flowing therethrough to the discharge point 64.

Accordingly, as soon as faucet 64 is opened by the user, contact 52a closes and completes an obvious circuit from the lower conductor of the power line 46 through contact 52a and the solenoid 48 to the upper conductor of the power line. The solenoid thus is energized immediately and closes its contacts 48a and 48b. Contact 48a upon closing completes a circuit from the upper conductor of the power line through conductor 44, switches 40 to 43, inclusive, and spring clamping brackets 36 to 39, inclusive, to the outer electrode 10 of the individual heater stages. Contact 48b upon closing completes an obvious circuit from the lower conductor of the power supply line through conductor 45 and brackets 34 and 34a to the aforementioned bus, including inner electrodes 14 of the respective stages. It will be seen, in other words, that the full voltage of the power line 46 is impressed across the inner and outer electrodes of each stage, so that current flows through the water between the two electrodes as the water flows through chamber 16. The electrical resistance of the water to this current flow results in heat being generated in the resistor (i. e., the water) and the water consequently increases progressively in temperature as it proceeds from stage to stage along the length of my heating unit, whereby it leaves the unit at elevated temperature.

Preferably my heater is installed as close to the discharge point 64 as possible. When this is done, even though the water in the entire system is cold before faucet 64 is opened, the action of the heater is so fast that the water discharged from the faucet is fully heated almost from the moment it starts to flow. As soon as the faucet is closed, pressure switch 52 of course causes contact 52a to open, de-energizing solenoid 48 and opening contacts 48a and 48b so that the heating terminates immediately. Electrical energy is used, in other words, only when the water is flowing, and that energy is transformed entirely into heat which is imparted solely and directly to the water discharged from the system.

The over-all length of a four-stage unit such as shown in the drawing is approximately one foot, and the maximum transverse dimension of the heater and its mounting panel is a matter of only a few inches. Because of its small size, it is very easy in most installations to locate the heater close to the point of discharge. Where the user's premises has more than one utilization line such as 60, I prefer to provide a separate heater for each line, the individual heaters being close to the discharge point in each case. In the event it is desired to convert an existing cold water line to a hot water line, this may easily be accomplished by cutting a small section from the line and inserting my heater in series relationship between the cut ends—substituting it in effect for the small section removed.

As previously suggested, my heating unit may be provided with as many stages as desired and the more stages used the greater will be the total quantum of heat delivered to the water passing therethrough. In many installations less heating effect is required than the unit is capable of producing, and it is for this reason that I have provided the individually operable switches 40 to 43. By opening manual switch 40, stage A can be disabled so that water passing through the unit will be heated only in stages B, C and D. With switches 40 and 41 both open, stages A and B are disabled so that only the two remaining stages are effective in heating the water when faucet 64 is opened. It thus will be seen that by means of the switches the user can preselect the stages which will be effective and by determining the number of stages to be used can regulate the amount of heat added to water passing through the unit.

In order to provide a greater range of selectivity as regards temperature of the water discharged from the unit, I prefer that the individual stages differ somewhat from one another in their heating capacity; and this may easily be achieved by differences in the radial spacing between the inner and outer electrodes. Very satisfactory results have been achieved, for example, where the radial clearance between the two electrodes is .09 inch in stage A, .08 inch in stage B, .065 inch in stage C and 0.48 inch in stage D. It will be understood of course that the spacing has been exaggerated in the drawings for the purpose of clarity.

The manner in which my heater is mounted makes it very easy to remove and replace in connection with the servicing thereof. To remove the unit, it is only necessary to loosen and disconnect the hose couplings 56 and 62 after which the heater may be pulled away from panel 32 to free it from the spring clamping brackets which normally hold it in place. Such removal breaks all electrical connections to the unit and when it is restored (or a replacement heated substituted in its place), the mere insertion of same in the spring brackets not only supports it in secure fashion but also re-establishes all of the necessary electrical connections.

From the foregoing it will be seen that my invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as many possible modifications of the invention may be made without departing from the scope thereof, it is to be understood that all matter herein set forth or shown in the accompanying drawings is to be interpreted as illustrative and not in a limiting sense.

Having thus described my invention, I claim:

1. In an electrically energized heating device of the character described, an elongate bus, a plurality of axially spaced tubular electrodes encircling the bus, insulator disks at the opposite ends of each electrode supporting the same on the bus in radially spaced relation thereto, each electrode and its end disks forming with the bus an annular chamber encircling the bus, and a passageway through the bus from each chamber to the next.

2. In an electrically energized heating device of the character described, an elongate bus, a plurality of axially spaced tubular electrodes encircling the bus, insulator disks at the opposite ends of each electrode supporting the same on the bus in radially spaced relation thereto, each electrode and its end disks forming with the bus an annular chamber encircling the bus, a passageway through the bus from each chamber to the next, said bus comprising a plurality of sections disposed end to end with a screw-threaded connection between adjacent ones of said sections, and each such connection being intermediate an adjacent pair of said electrodes.

3. In an electrically energized heating device of the character described, an elongate bus, a plurality of axially spaced tubular electrodes encircling the bus, insulator disks at the opposite ends of each electrode supporting the same on the bus in radially spaced relation thereto, each electrode and its end disks forming with the bus an annular chamber encircling the bus, a passageway through the bus from each chamber to the next, a support, and a plurality of brackets on said support, each of said brackets having opposed members engaging opposite sides of one of said electrodes under inwardly directed pressure to clamp the electrode therebetween.

4. A device as in claim 3 wherein said support carries at least one bracket having opposed members which engage opposite sides of said bus and clamp same therebetween.

5. In a device as in claim 3, a source of electrical energy, means connecting one side of said source to said bus, and a separate connection from each of said brackets to the other side of said source, each of said separate connections containing an individually operable switch for opening and closing the connection.

6. In a heating device of the character described, an elongate bus, a plurality of axially spaced tubular electrodes encircling the bus, insulator disks at the opposite ends of each electrode supporting same on the bus in radially spaced relation thereto, a source of electrical energy, a circuit from one side of said source to said bus and a second circuit from the other side of said source to at least one of said electrodes, an electrical contact in one of said circuits, each of said electrodes and its end disks forming with the bus an annular chamber encircling the bus, a liquid flow passageway having said chambers in series therein, a pressurized liquid supply line connected to one end of said passageway, a valved discharge line connected to the other end of said passageway, and means controlled by the liquid in one of said lines for maintaining said electrical contact open whenever the liquid in said line is in a static condition and maintaining the contact closed whenever said liquid is in a flowing condition.

7. A device as in claim 6 wherein the portion of said flow passageway between adjacent ones of said chambers extends through said bus.

8. A device as in claim 7 wherein said bus comprises a plurality of sections disposed end to end with a screw-threaded connection between adjacent sections, each such connection being intermediate adjacent ones of said chambers.

9. In a heating device of the character described, an elongate bus, a plurality of axially spaced tubular electrodes encircling the bus, insulator disks at the opposite ends of each electrode supporting same on the bus in radially spaced relation thereto, each electrode and its end disks forming with the bus an annular chamber encircling the bus, a passageway through the bus from each chamber to the next, a first electrical conductor connected to said bus, a second electrical conductor connected by branch lines to the respective ones of said electrodes, an individually operable switch in each branch line for opening and closing same, a source of electrical energy, and switch means operable to connect the opposite sides of said source to the respective ones of said conductors.

10. In a heating device of the character described, an elongate bus, a plurality of axially spaced tubular electrodes encircling the bus, insulator disks at the opposite ends of each electrode supporting same on the bus in radially spaced relation thereto, a first electrical conductor connected to said bus, a second electrical conductor connected by branch lines to the respective ones of said electrodes, an individually operable switch in each branch line for opening and closing same, a source of electrical energy, a pair of circuits connecting the respective ones of said conductors to the opposite sides of said source, one of said circuits including an electrical contact, each tubular electrode and its end disks forming with the bus an annular chamber encircling the bus, a liquid flow passageway having said chambers in series therein, a pressurized liquid supply line connected to one end of said passageway, a valved discharge line connected to the other end of said passageway, and means controlled by the liquid in one of said lines for maintaining said contact open whenever the liquid in said line is in a static condition and maintaining the contact closed whenever said liquid is in a flowing condition.

11. A device as in claim 10 wherein the portion of said flow passageway between adjacent ones of said chambers extends through said bus.

12. In a heating device of the character described, a cylindrical inner electrode having integral therewith a pair of nipples of reduced diameter extending axially from opposite ends thereof, a centrally apertured insulating disk encircling each nipple and secured thereto, a tubular outer electrode encircling said inner electrode and coaxial therewith, said outer electrode being supported on and between said disks and being radially spaced from said inner electrode to form therewith an annular chamber, said chamber having an inlet passageway extending through the inner electrode and opening axially through the end of one of said nipples, and said chamber having an outlet passageway extending through the inner electrode and opening axially through the end of the opposite nipple.

13. A heating unit as in claim 12 wherein said inlet and outlet passageways open into said chamber at axially spaced points, the respective ones of said openings being on opposite sides of said inner electrode.

14. In a device of the character described, a support, a heating unit detachably mounted on said support, said heating unit comprising an elongate bus, a plurality of axially spaced tubular electrodes encircling the bus, insulator disks at the opposite ends of each electrode supporting the same on the bus in radially spaced relation thereto, each electrode and its end disks forming with the bus an annular chamber encircling the bus, a passageway through the bus from each chamber to the next, a source of electrical energy, electrical terminals arranged to be energized from said source, said terminals positioned on said support to engage said bus and electrodes when said heating unit is mounted thereon whereby removal of said heating unit from the support also breaks all electrical connections thereto.

15. A device as in claim 14 wherein said bus comprises a plurality of sections disposed end to end with screw-threaded connections between adjacent ones of said sections, each such connection being intermediate an adjacent pair of said electrodes.

16. In an electrically-energized heating device of the character described, an elongate bus, a plurality of axially spaced tubular electrodes encircling the bus, insulator disks at the opposite ends of each electrode, supporting the same on the bus in radially spaced relation thereto, each electrode and its end disks forming with the bus an annular chamber encircling the bus, a passageway through the bus from each chamber to the next, a support, a plurality of brackets on said support constructed to receive and clamp said bus at axially spaced points thereon, a source of electrical energy, a circuit connecting one side of said source to at least one of said brackets, and another circuit connecting the other side of said source to said electrodes.

17. In an electrically energized heating device of the character described, an elongate bus, a plurality of axially spaced tubular electrodes encircling the bus, insulator disks at the opposite ends of each electrode supporting the same on the bus in radially spaced relation thereto, each electrode and its end disks forming with the bus an annular chamber encircling the bus, a passageway through the bus from each chamber to the next, a support, a plurality of spaced mounting brackets on said support, some of said brackets being constructed and arranged to receive and hold said electrodes, the rest being constructed and arranged to receive and hold said bus, and a source of electrical energy connected to said bus and electrodes via said brackets.

References Cited in the file of this patent

UNITED STATES PATENTS

| | | |
|---|---|---|
| 845,051 | Brockdorff | Feb. 26, 1907 |
| 895,638 | Hill | Aug. 11, 1908 |
| 1,438,445 | Loubiere | Dec. 12, 1922 |
| 1,463,617 | Eisselt | July 31, 1923 |